R. E. HELLMUND.
LOCOMOTIVE.
APPLICATION FILED OCT. 30, 1916.
1,300,389.
Patented Apr. 15, 1919.
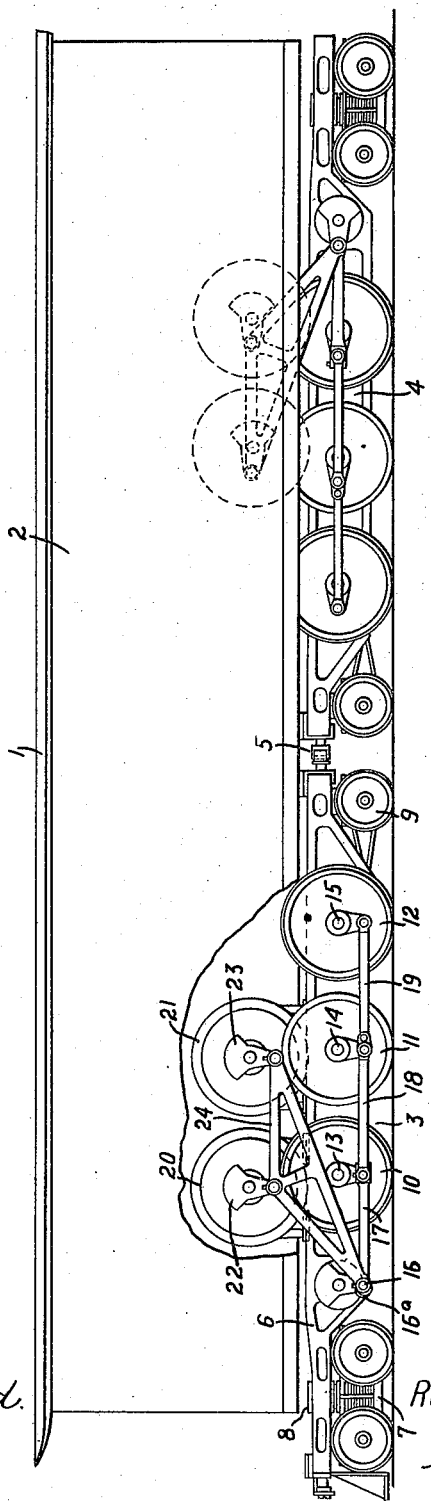
WITNESSES:
Fred. A. Lind.
W. B. Wells
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

LOCOMOTIVE.

1,300,389.   Specification of Letters Patent.   Patented Apr. 15, 1919.

Application filed October 30, 1916. Serial No. 128,425.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Locomotives, of which the following is a specification.

My invention relates to locomotives and particularly to electric locomotives.

One object of my invention is to provide a locomotive which shall have the propelling motors thereof advantageously located relative to the driving wheels, so that the driving wheels may have short rigid wheel-bases and carry a large proportion of the weight of the locomotive.

Another object of my invention is to provide a locomotive of the above-indicated character which shall have the propelling motors thereof mounted above the driving wheels, a jack shaft located adjacent to the driving wheels and connected thereto by side rods, and a rigid member for connecting the various motors to the jack shaft.

More specifically, my invention consists in a locomotive embodying a cab and two articulated running gears. Each of the running gears comprises a four-wheel pivotal outer truck, a two-wheel radial inner truck, and three pairs of driving wheels disposed between the pivotal and the radial truck. A jack shaft is located adjacent to the driving wheels and is connected thereto by means of side rods. The propelling motors, which are mounted above the driving wheels, are connected to the jack shaft by a rigid triangular-shaped member, which is particularly adapted to resist whipping strains.

The single figure of the accompanying drawing is a partial elevational view of a locomotive constructed in accordance with my invention.

Referring to the accompanying drawing, a locomotive 1 embodies a cab 2 and two articulated running gears 3 and 4 which are connected together by an articulated connection 5.

Each of the articulated running gears comprises side frames 6, a four-wheel pivotal outer truck 7 which is connected to the side frames 6 by a pivotal connection 8, a two-wheel radial inner truck 9 and three pairs of driving wheels 10, 11 and 12 which are, respectively, mounted on driving axles 13, 14 and 15. The three pairs of driving wheels are located between the pivotal truck 7 and the radial truck 9, and, intermediate the pair of driving wheels 10 and the pivotal truck 7, is disposed a jack shaft 16 having crank disks 16ª mounted thereon which are connected to the driving wheels 10, 11 and 12 by means of side rods 17, 18 and 19.

Two propelling motors 20 and 21, having crank disks 22 and 23 mounted thereon, are located substantially above the pairs of driving wheels 10, 11 and 12. A rigid triangular-shaped member 24, which is braced to resist whipping strains, is adapted to connect the two motor crank disks 22 and 23 to the jack-shaft crank disks 16ª. Thus, the two motors are rigidly connected together and to the jack shaft 16, whereby the driving effort of the motors may be conveniently transmitted to the driving wheels 10, 11 and 12.

The running gears 3 and 4 may be joined to the cab 2 by the usual pivotal connections or may be connected thereto by means of a connection such as is disclosed in an application of George M. Eaton, Serial No. 132,091, filed Nov. 18, 1916, and assigned to the Westinghouse Electric & Manufacturing Company.

Variations in the structure and arrangement and location of parts may be made without departing from the spirit and scope of my invention, and such modifications are intended to be covered by the appended claims.

I claim as my invention:

1. In a locomotive, the combination with a plurality of pairs of driving wheels, a jack shaft disposed adjacent to said driving wheels, and means, comprising side rods, for connecting the jack shaft to the driving wheels, of a plurality of motors mounted adjacent to said driving wheels, and a rigid member for joining said motors to the jack shaft.

2. In a locomotive, the combination with a plurality of driving wheels, a jack shaft disposed adjacent to said driving wheels, and means, comprising side rods, for connecting the jack shaft to the driving wheels, of two motors mounted adjacent to said driving wheels, means for connecting one of said motors to said jack shaft and for connecting the second motor to the first motor, whereby the driving effort of the motors may be transmitted to the driving wheels.

3. In a locomotive, the combination with a plurality of driving wheels, a jack shaft disposed adjacent to but outside the wheel-base of said driving wheels, and means, comprising side rods, for joining the jack shaft to the driving wheels, of two motors mounted substantially over said driving wheels, and a rigid connecting means for joining said motors to the jack shaft.

4. In a locomotive, the combination with a plurality of driving wheels, a jack shaft located at one side of the driving wheels and substantially in the same horizontal plane therewith, and means, comprising side rods, for connecting the jack shaft to the driving wheels, of two motors mounted over the driving wheels, and a triangular-shaped member for joining the motors to the jack shaft.

5. In a locomotive, the combination with a cab, of two articulated running gears, each of said running gears comprising a four-wheel pivotal truck, a two-wheel radial truck, a plurality of driving wheels disposed between said trucks, a jack shaft located between the four-wheel truck and the driving wheels, means, comprising side rods, for joining the jack shaft to the driving wheels, two motors mounted over said driving wheels and a triangular-shaped member connecting said motors to the jack shaft.

6. In a locomotive, the combination with a pair of driving wheels, a jack shaft disposed adjacent to said driving wheels, and a side rod for connecting the jack shaft to the driving wheels, of a plurality of motors, and a rigid triangular-shaped member for joining the motors to the jack shaft, whereby the driving effort of the motors may be transmitted to the driving wheels.

7. In a locomotive, the combination with three pairs of driving wheels, a jack shaft disposed adjacent to one pair of said driving wheels, and means, comprising side rods, for connecting the jack shaft to the driving wheels, and a triangular-shaped member for connecting the motors to the jack shaft, whereby the driving effort of the motors may be transmitted to the driving wheels.

8. In a locomotive, the combination with a plurality of pairs of driving wheels, a jack shaft disposed adjacent to said driving wheels, and means, comprising side rods, for connecting the jack shaft to the driving wheels, of two motors mounted above said driving wheels, and a rigid triangular-shaped member for joining the motors to the jack shaft.

9. In a locomotive, the combination with a plurality of pairs of driving wheels, a jack shaft disposed adjacent to and outside the rigid wheel-base of said driving wheels, and means, comprising side rods, for connecting the jack shaft to the driving wheels, of two motors mounted over said driving wheels, and means for connecting one of said motors to the other motor and for connecting the latter motor to the jack shaft, whereby the driving effort of the motors may be transmitted to the driving wheels.

10. In a locomotive, the combination with a plurality of driving wheels, of a jack shaft disposed outside the wheel-base of the driving wheels and carrying a crank arm, side rods for joining said driving wheels and said crank arm, two motors mounted above and within the wheel-base of said driving wheels, said motors comprising shafts carrying crank arms, and a rigid triangular frame connecting the cranks on the two motor shafts to the crank on the jack shaft.

In testimony whereof, I have hereunto subscribed my name this 25th day of Oct., 1916.

RUDOLF E. HELLMUND.

Copies of this patent may be obtained for five cents each, by addressing the "Commissioner of Patents, Washington, D. C."